(12) United States Patent
Dea

(10) Patent No.: US 9,064,662 B1
(45) Date of Patent: Jun. 23, 2015

(54) VARIABLE GAP TUNNEL JUNCTION SWITCH

(75) Inventor: Jack Y. Dea, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 599 days.

(21) Appl. No.: 13/436,246

(22) Filed: Mar. 30, 2012

Related U.S. Application Data

(63) Continuation-in-part of application No. 13/151,477, filed on Jun. 2, 2011.

(51) Int. Cl.
*H02N 1/00* (2006.01)
*H02N 1/04* (2006.01)
*H02N 2/00* (2006.01)
*H02N 10/00* (2006.01)
*H01H 57/00* (2006.01)

(52) U.S. Cl.
CPC ..................... *H01H 57/00* (2013.01)

(58) Field of Classification Search
CPC ............. H02N 1/08; H02N 1/00; H01L 41/08

USPC .......... 310/309, 311, 313 A, 313 B, 314, 315, 310/317, 318, 323.06; 65/25.4; 322/2 R; 361/278, 289

See application file for complete search history.

(56) References Cited

U.S. PATENT DOCUMENTS

| 3,405,334 A * | 10/1968 | Jewett et al. .................. 361/289 |
| 6,775,124 B2 * | 8/2004 | Cheung .......................... 361/326 |
| 2009/0091340 A1 * | 4/2009 | Kim et al. ...................... 324/722 |

* cited by examiner

*Primary Examiner* — Joshua Benitez-Rosario
*Assistant Examiner* — Jose Gonzalez Quinone
(74) *Attorney, Agent, or Firm* — SPAWAR Systems Center Pacific; Kyle Eppele; Stephen E. Baldwin

(57) ABSTRACT

A variable gap switch includes a first electrode having a first gap surface; a second electrode having a second gap surface, the second gap surface formed in an initial fluid state that hardens to substantially conform to the first gap surface, the first electrode being moveable with respect to the second electrode; an alignment guide providing substantially parallel and substantially opposed alignment of the first gap surface and the second gap surface; and a displacement mechanism positioned to provide selective movement of the first electrode with respect to the second electrode so that a gap between the electrodes is selectively adjustable.

7 Claims, 3 Drawing Sheets

VARIABLE GAP TUNNEL JUNCTION SWITCH

CROSS-REFERENCE TO RELATED APPLICATION

This application is a continuation-in-part of U.S. patent application Ser. No. 13/151,477, filed 2 Jun. 2011, titled "Variable Capacitor Based Mechanical to Electrical Generator", incorporated by reference herein in its entirety.

FEDERALLY-SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone 619-553-2778; email: T2@spawar.navy.mil. Please reference Navy Case No. 101257.

BACKGROUND

This disclosure relates generally to the field of electrical switches and more particularly to the field of thermally isolating electrical switches.

A prior art technique for electrical switching is accomplished through transistors. Transistors however use variable resistance to control current and as a consequence generate heat that may ultimately lead to the degradation and destruction of the transistor-based switch. For certain applications, it is desirable to have a switching configuration that exhibits greater heat tolerance than a traditional transistor switching scheme.

SUMMARY

A variable gap switch includes a first electrode having a first gap surface; a second electrode having a second gap surface, the second gap surface formed in an initial fluid state that hardens to substantially conform to the first gap surface, the first electrode being moveable with respect to the second electrode; an alignment guide providing substantially parallel and substantially opposed alignment of the first gap surface and the second gap surface; and a displacement mechanism positioned to provide selective movement of the first electrode with respect to the second electrode so that a gap between the electrodes is selectively adjustable. The gap of the switch permits thermal isolation of one side of the switch from the other.

DETAILED DESCRIPTION

The inventor's previous work with a variable capacitor (see co-pending U.S. patent application Ser. No. 13/151,477) revealed that it is possible to form a surface-conformable electrode directly upon a capacitor's ceramic element. Moving the electrode with respect to the ceramic element varied the capacitance of the capacitance.

This concept is taken further within the present disclosure such that a switch is created between a first electrode and a second electrode. The second electrode is formed on the surface of the first electrode. In essence, the second electrode surface closely conforms to surface irregularities in the first electrode. When displaced from each other, the resulting narrow gap between the surfaces permits electron tunneling. The electron tunneling allows an electrical connection to be made while simultaneously thermally isolates one electrode from the other. The thermal isolation makes it possible, in one scenario, to thermally isolate a load from a power supply. Such isolation minimizes the deleterious effects of heat on a thermally-sensitive load or on-the-other-hand allows a hot load (such as a heater) to be thermally isolated from a power source and its sensitive electronics.

Figure 1:
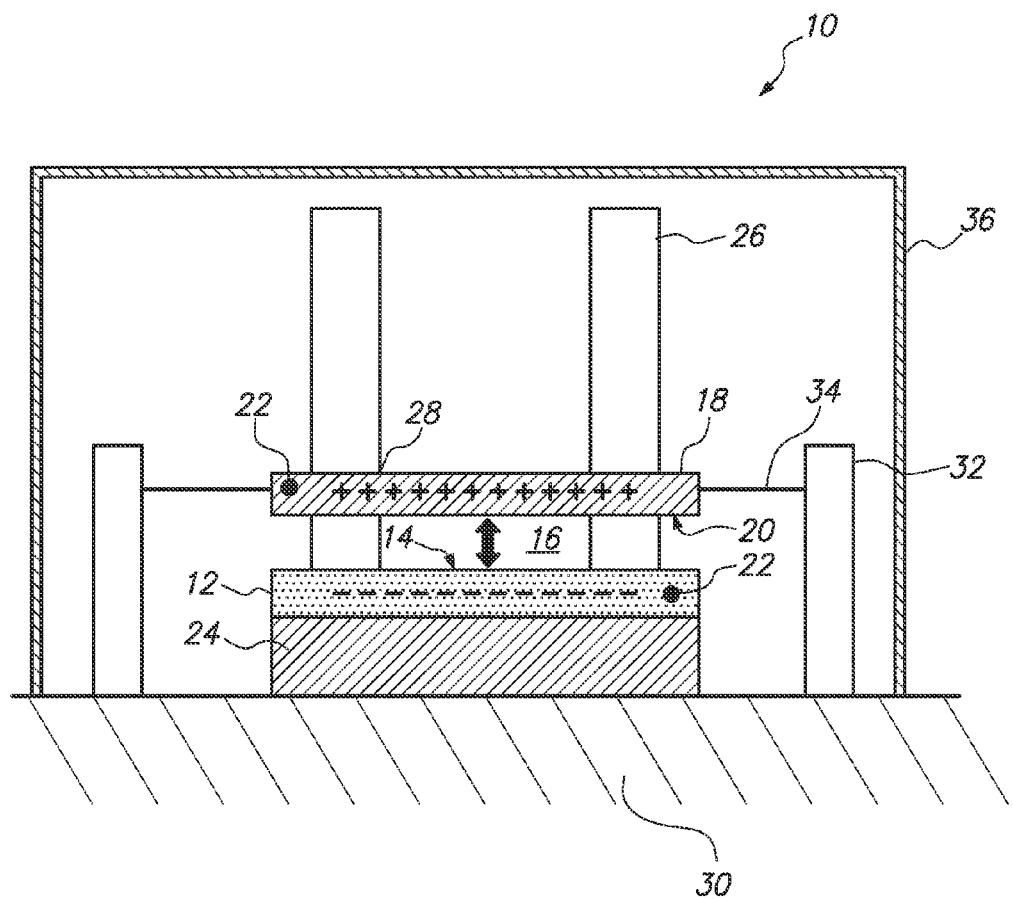
FIG. 1 illustrates an exemplary variable gap tunnel junction switch according to the description herein.

Referring now to FIG. 1, component parts of the variable gap tunnel junction switch (VGTJS) 10 are shown. Switch 10 has a first electrode 12 having a first "gap" surface 14. By "gap" surface, what is meant is a surface that ultimately makes up one of the surfaces of the gap that is selectively formed between two electrodes of switch 10. First gap surface should be a highly polished surface. Generally, highly polished surfaces are obtained by fine mechanical polishing followed by electrolyte polishing. Such a surface will have a surface roughness of about 50 nano-meters or less. It is worth noting that at the nano-meter level, first gap surface 14 will still likely contain a number of surface irregularities that, unless matched corresponding well by an adjacent gap surface, will substantially limit the ability to carry out efficient electron tunneling across gap 16 as shown in the figure.

To lessen the effects of surface irregularities and to enhance the ability of successful electron tunneling, a second electrode 18 is provided that has a second gap surface 20 that substantially conforms to first gap surface 14. The conforming surface of second gap surface 20 is made possible by forming the second gap surface initially in a liquid state and then allowing the surface to harden. An example of a suitable material for such a surface is solder, wherein any of a range of solders can be used including high temperature hard silver solder for example. By melting the second gap surface onto the first gap surface 14, no substantial air gap will exist between the two gap surfaces when immediately adjacent. The entire second electrode 18 may be made of solder wherein the first electrode may be of any suitable conducting metal such as nickel or copper. The charge (+ or −) designation of these electrodes is arbitrary and may be reversed from those shown, these charges being provided to the electrodes by way of contacts 22.

To move first electrode 12 with respect to second electrode 18, a displacement mechanism 24 is provided that may be any suitable mechanism. Specific examples of such a mechanism are those of mechanical or electro-mechanical construction. To retain alignment of first electrode 12 and second electrode 18, there is provided at least one alignment guide 26 that is non-conducting and that may be placed through vias 28 defined in electrode 18. In this example, guide 26 is fixed to electrode 12. Of course, other ways may be devised to confine movement of the electrodes, for example by a guide mechanism placed exterior of the electrodes that permits movement of the electrodes only towards or away from each other. When a guide is positioned within an electrode, the guide may take on a cross-section of any of a variety of shapes, such as circular, square, rectangular and the like.

In the embodiment shown in FIG. 1, first electrode 12 is designed to move. Which electrode moves with respect to the other is arbitrary and may be selected for design convenience. In the example shown, second electrode 18 is "fixed" in position with regard to a fixed foundation 30. The stabilization of second electrode 18 is accomplished via anchor posts 32 and 34. It should also be readily apparent that the displacement mechanism used may be directly coupled to either of the electrodes desired to be moved. Such a mechanism is not restricted to being directly attached to first electrode 12 any more than second electrode 18.

During fabrication, such as when second electrode 18 is poured or cast to conform to first electrode 12, the hardened second electrode can be easily freed from the first electrode by displacement mechanism 24 acting to draw first electrode 24 from second electrode 18. Where displacement mechanism 24 is a piezo-electric material, such as lead zirconate titanate (PZT), energization of the material can be used to pull electrode 12 from electrode 18. In many instances however, the solder used as electrode 18 will readily be freed from electrode 12.

Finally, the components of the Variable Gap Tunnel Junction Switch 10 so far discussed are placed into a vacuum container 36 and the contents of the container placed under a vacuum. The vacuum is provided to enhance the separation of the two electrodes.

Figure 2:
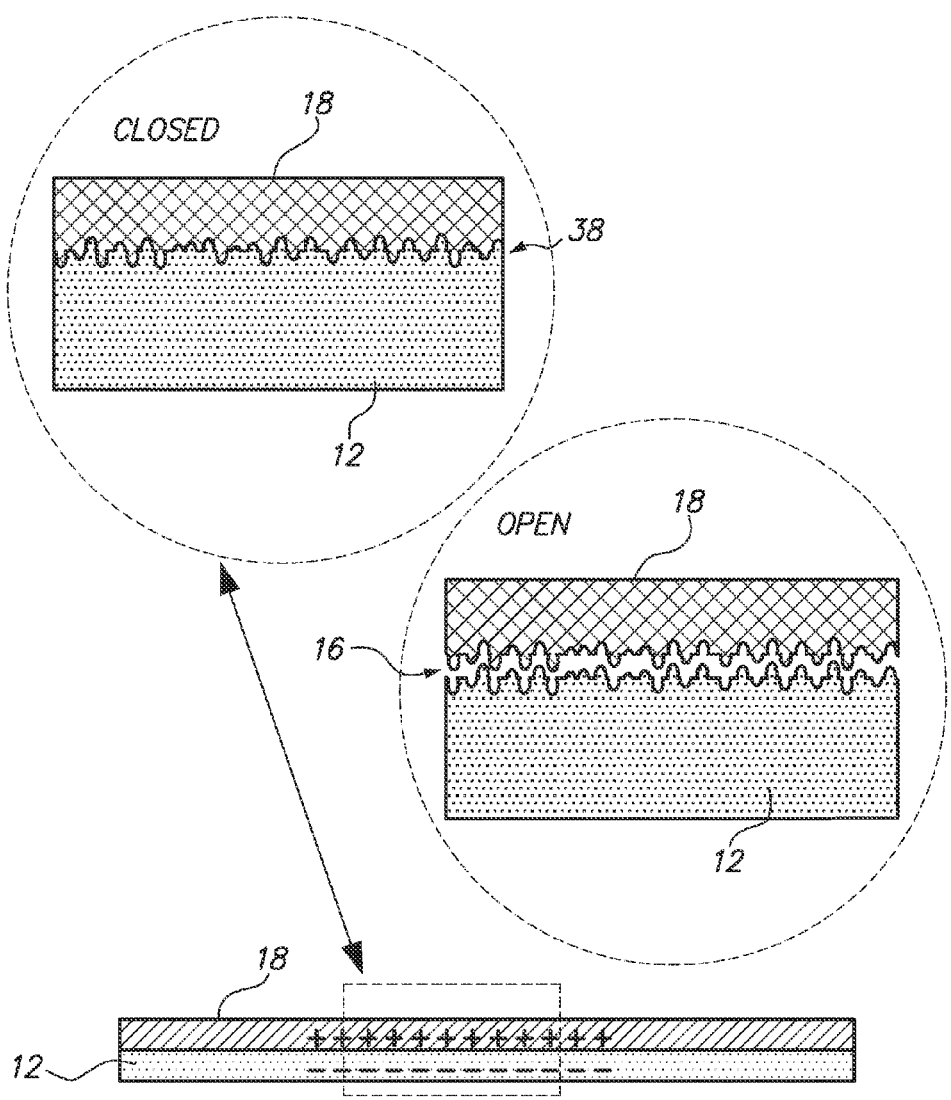
FIG. 2 illustrates an exemplary electrode-to-electrode interface according to the description herein.

Referring now to FIG. 2, a more detailed perspective is shown regarding construction and configuration of the electrodes as used in switch 10. As previously described, second electrode 18 is formed by melting it to the exposed gap surface of first electrode 12. This "casting" procedure allows electrode 18 to conform its molecular boundary to match the molecular boundary of electrode 12. As such, surface roughness or irregularities are accounted for by providing a "matched" boundary 38. By utilizing molten, liquefied, metal to generate a conforming surface, any air gap that would otherwise exist between the surfaces is substantially removed.

The upper close-up shown in FIG. 2 illustrates how practically no air gap exists at matched boundary 38. The lower close-up shown in FIG. 2 shows air gap 16 that is present when electrode 12 is purposely separated from electrode 18. The conformal surfaces present at gap 16 enhance tunnel currents when the two electrodes are appropriately positioned from each other. Specifically, while gap 16 can be adjusted from zero to any desired gap thickness, at gap widths of 1 to 10 nano-meters (nm), strong tunnel currents can exist if a potential difference is present between the electrodes. The switch is considered to be fully conducting at gap=0, partially conducting at a gap of approximately 1 to 10 nm, and essentially non-conducting for gap of approximately >>10 nm. It should be noted that using technology from atomic force microscope, a PZT displacement mechanism can be used to control adjustment of the gap to less than 0.1 nm precision.

Figure 3:
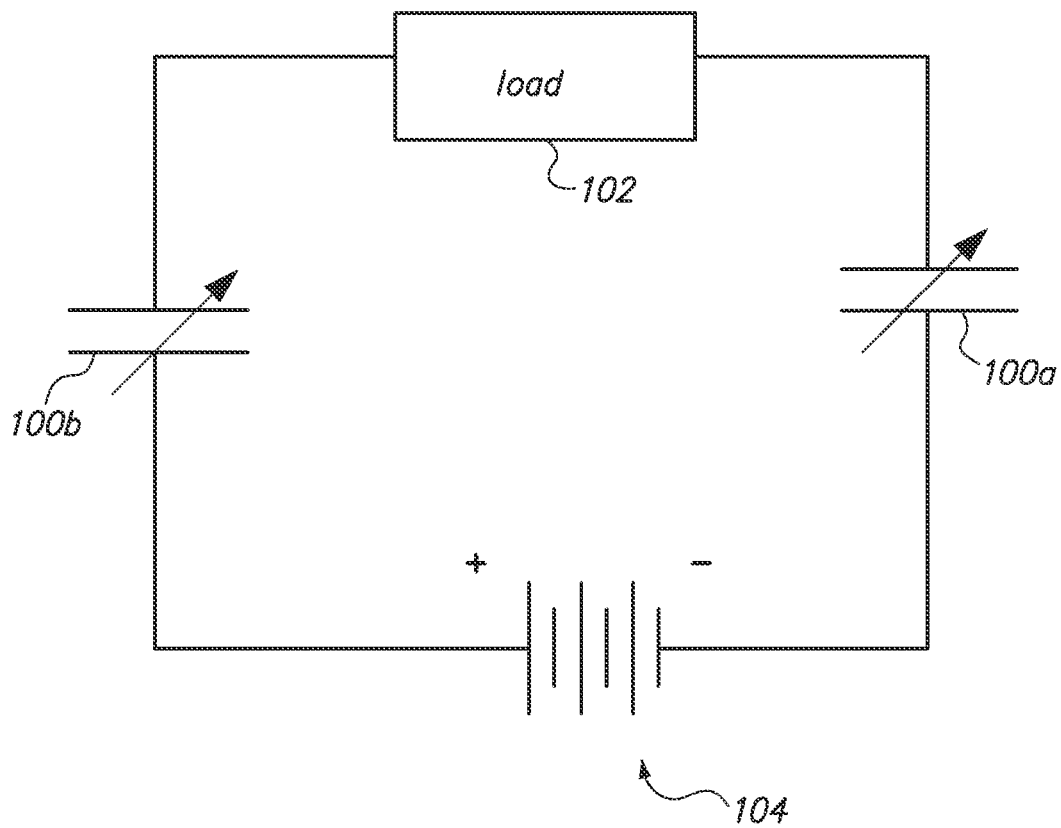
FIG. 3 illustrates an exemplary thermal isolation configuration according to the description herein.

Referring now to FIG. 3, there is shown an exemplary embodiment of the variable gap tunnel junction switch (VGTJS) utilized in a thermal isolation configuration. In this configuration, a VGTJS (shown as 100*a* and 100*b*) is placed in electrical series between each side of a load 102 and a power supply 104 that can be either alternating current (AC) or direct current (DC).

Use of the VGTJS allows heat to be confined to the power supply side. This is contrasted to the use of semiconductor transistor switches that will permit heat to be conducted more widely including back to a utilized power supply. By using the VGTJS, heat is prevented from migrating from the power supply to the load side as thermal electrons cannot readily pass over the vacuum gap of the VGTJ switch. In the VGTJS, there are no semiconductor materials to burn out. For those situations wherein the electrodes of the VGTJS become hot, the heat can be conducted from the electrodes by sufficient heat sinks such as cooling fins.

In view of the above, it will be understood that many additional changes in the details, materials, steps and arrangement of parts, which have been herein described and illustrated to explain the nature of the disclosure, may be made by those skilled in the art within the scope of the disclosure as expressed in the appended claims.

What is claimed is:

1. A variable gap switch apparatus comprising:
   a first electrode having a first gap surface, the first electrode being a metal;
   a second electrode having a second gap surface, the second electrode being solder formed in an initial fluid state that hardens to substantially conform to the first gap surface, the first electrode being moveable with respect to the second electrode;
   at least one alignment guide disposed through a via defined in at least one of the first and second electrodes, the at least one alignment rod providing substantially parallel and substantially opposed alignment of the first gap surface and the second gap surface;
   a piezoelectric displacement mechanism positioned to provide selective movement of the first electrode with respect to the second electrode so that a gap between the electrodes is selectively adjustable; and
   a vacuum chamber surrounding the first and second electrodes and the at least one alignment rod and piezoelectric displacement mechanism, wherein a vacuum is created in the vacuum chamber.

2. The apparatus of claim 1 wherein the first gap surface is polished to have a surface roughness of approximately 50 nano-meters or less.

3. The apparatus of claim 2 wherein no substantial air gap exists between the first and second gap surfaces when the first gap surface is in contact with the second gap surface.

4. The apparatus of claim 1 wherein the piezoelectric material is lead zirconate titanate (PZT).

5. The apparatus of claim 1 further including at least one anchor post fixably attached to the second electrode and a fixed reference so that movement of the second electrode is arrested with respect to the fixed reference and so that the first electrode is movable with respect to the second electrode.

6. The apparatus of claim 5 wherein the displacement mechanism is operably coupled to the first electrode.

7. The apparatus of claim 2 wherein the gap between the first and second electrodes is 10 nano-meters or less.

\* \* \* \* \*